United States Patent
Rogalla et al.

(10) Patent No.: US 9,494,479 B2
(45) Date of Patent: Nov. 15, 2016

(54) DRIVE SHAFT BALANCING MACHINE HAVING TWO PEDESTALS AND FIRST AND SECOND VIBRATION SENSORS AND BALANCING METHOD

(71) Applicant: Schenck RoTec GmbH, Darmstadt (DE)

(72) Inventors: Martin Rogalla, Darmstadt (DE); Dieter Thelen, Modautal (DE); Karl Rabe, Darmstadt (DE)

(73) Assignee: Schenck RoTec GmbH, Darmstadt (DE)

( * ) Notice: Subject to any disclaimer, the term of this patent is extended or adjusted under 35 U.S.C. 154(b) by 236 days.

(21) Appl. No.: 14/175,071

(22) Filed: Feb. 7, 2014

(65) Prior Publication Data
US 2014/0224013 A1    Aug. 14, 2014

(30) Foreign Application Priority Data
Feb. 12, 2013  (DE) ............... 10 2013 101 375

(51) Int. Cl.
*G01M 1/24*    (2006.01)
*G01M 1/22*    (2006.01)

(52) U.S. Cl.
CPC .............. *G01M 1/24* (2013.01); *G01M 1/22* (2013.01)

(58) Field of Classification Search
CPC .......... G01M 1/22; G01M 1/24; G01M 1/04; G01M 1/08; G01H 1/003; G01H 1/04; G01H 1/08
USPC ................ 73/462, 460, 468, 662–663, 666; 702/35–36, 39, 56, 279
See application file for complete search history.

(56) References Cited

U.S. PATENT DOCUMENTS

| | | | |
|---|---|---|---|
| 4,653,324 A | 3/1987 | Nugier | |
| 5,421,199 A | 6/1995 | Himmler | |

(Continued)

FOREIGN PATENT DOCUMENTS

| | | |
|---|---|---|
| DE | 1 135 208 A | 8/1962 |
| DE | 15 73 670 B2 | 7/1975 |

(Continued)

OTHER PUBLICATIONS

Bureau of Indian Standards, Mechanical Vibration—Methods and Criteria for the Mechanical Balancing of Flexible Rotors, Apr. 2008.*

(Continued)

*Primary Examiner* — Michael A Lyons
*Assistant Examiner* — David L Singer
(74) *Attorney, Agent, or Firm* — Collard & Roe, P.C.

(57) ABSTRACT

A drive shaft balancing machine for dynamic balancing of drive shafts includes two pedestals. Each pedestal includes a spring-mounted upper part receiving a rotary spindle, a support receiving an end of a drive shaft to be balanced and a first vibration sensor detecting upper part vibrations resulting from an unbalance of the drive shaft and further involved forces in at least a first degree of freedom of motion normal to the spindle axis. On the upper part of at least one pedestal a second vibration sensor is mounted which detects the vibrations of the upper part in at least a second degree of freedom of motion. An evaluating circuit analyzes and links the vibration signals of the first and the second vibration sensors so that pitch vibration excitations of the upper part not caused by the unbalance of the drive shaft do not enter the drive shaft unbalance value computed.

2 Claims, 1 Drawing Sheet

(56) References Cited

U.S. PATENT DOCUMENTS

| | | | |
|---|---|---|---|
| 5,533,400 A | 7/1996 | Gasch et al. | |
| 6,415,661 B1 | 7/2002 | Wiese | |
| 6,694,812 B2 | 2/2004 | Loetzner et al. | |
| 2011/0238335 A1* | 9/2011 | Sharp | G01M 1/22 702/56 |

FOREIGN PATENT DOCUMENTS

| | | |
|---|---|---|
| DE | 28 02 367 B2 | 7/1979 |
| GB | 803 975 A | 11/1958 |
| GB | 1 197 453 A | 7/1970 |
| GB | 2037445 A | 7/1980 |
| GB | 1 595 510 A | 8/1981 |
| GB | 2478836 A | 9/2011 |
| JP | S57-165731 A | 10/1982 |
| JP | S58-134248 A | 8/1983 |

OTHER PUBLICATIONS

Delgado et al, International Journal of Rotating Machinery: Balancing of an Experimental Rotor without Trial Runs, 2002.*
Li et al, Journal of Vibration and Control: Balancing of Flexible Rotors wiithout Trial Weights Based on Finite Element Modal Analysis, 2012.*
Great Britain Search Report in GB 1401745.3 dated Apr. 23, 2014.

* cited by examiner

DRIVE SHAFT BALANCING MACHINE HAVING TWO PEDESTALS AND FIRST AND SECOND VIBRATION SENSORS AND BALANCING METHOD

CROSS REFERENCE TO RELATED APPLICATIONS

Applicants claim priority under 35 U.S.C. §119 of German Application No. 10 2013 101 375.9 filed Feb. 12, 2013.

FIELD OF THE INVENTION

This invention relates to a drive shaft balancing machine for the dynamic balancing of drive shafts, comprising at least two pedestals arranged on a machine bed, each pedestal including a spring-mounted upper part mounting a spindle which is rotary about an axis and includes a support for an end of a drive shaft to be balanced and a first vibration sensor which detects vibrations of the upper part resulting from an unbalance of the drive shaft as well as further involved forces in at least a first degree of freedom of motion normal to the spindle axis. The present invention relates furthermore to a method for the dynamic balancing of drive shafts.

BACKGROUND OF THE INVENTION

Drive shaft balancing machines are known, inter alia, from DE 28 02 367 B2 and U.S. Pat. No. 6,694,812 B2. In drive shaft balancing machines, the drive shafts to be balanced are received at either end by a rotary spindle of a pedestal. The spindle is carried in a bearing housing supported on the pedestal by means of springs. The springs, which are generally leaf springs, are arranged in a way enabling the upper part to vibrate as a result of parallel displacement of its spindle axis and responding only to transverse forces produced by an imbalance of the drive shaft and transmitted to the upper part through the joints and the spindle. Considering that the joints of the drive shaft transmit no bending moments, the pedestals of drive shaft balancing machines are configured as unbalance measuring devices for a single plane, with one vibration sensor being arranged on each pedestal to detect the vibrations of the pedestal upper part in the degree of freedom of motion normal to the spindle axis. This configuration has since been proven in practice.

In a crankshaft balancing machine known from DE 15 73 670 B2, the bearing bracket of a pedestal is carried on two vibration-detecting force transducers having different measuring directions lying in the bearing plane. The signals of the two force transducers are split up by evaluating circuits according to their Cartesian vibration components, from which the circular and polar or anti-circular components are represented.

JP 57 165 731 A discloses an imbalance correcting system in which the rotor is carried in two bearings by means of bearing pins. Each bearing includes a first vibration sensor for detecting the vibrations of the bearing pin and, spaced therefrom, a second vibration sensor measuring in the same direction as the first one and detecting vibrations of coupling parts arranged at the end of the bearing pin.

SUMMARY OF THE INVENTION

With the need to measure drive shafts at relatively high speeds in the vicinity of their normal running speed increasing, it has however shown that at higher speeds the demands for accuracy of the unbalance measurement can no longer be met to satisfaction. It is therefore an object of the present invention to provide a drive shaft balancing machine of the type initially referred to which enables accurate measurements also at higher balancing speeds close to the normal running speed of the drive shaft. It is another object of the present invention to provide an improved method of the type initially referred to.

With regard to the drive shaft balancing machine, the object referred to is accomplished by the features described herein. An advantageous embodiment of the balancing machine is set out herein. With regard to the method, the object referred to is accomplished by the method features recited herein, and a further development of this method is accomplished with the features recited herein.

In the drive shaft balancing machine of the invention, the upper part of at least one pedestal mounts a second vibration sensor which detects the vibrations of the upper part in at least a second degree of freedom of motion, with the vibration signals of the first and the second vibration sensor being fed to an evaluating circuit which analyzes the vibration signals and links them in such a way that pitch vibration excitations of the upper part do not enter the unbalance value of the drive shaft computed in the evaluation.

The present invention resides in the realization that the pedestal upper part, in the presence of relatively high balancing speeds and in spite of exclusive excitation by transverse forces caused by unbalance and spring support guiding normal to the axis of rotation, executes vibrations in which the spindle axis is no longer moved purely parallel, the movement containing instead additional components of a pitch about an axis extending in a direction transverse to the spindle axis and transverse to the guiding direction of the spring support. The dynamic stiffness of the springs supporting the upper part, which stiffness counteracts pitch motions, decreases at high speeds and, with the speed increasing, may cause a pitch resonance to be produced at which the pedestal upper parts no longer respond exclusively to radial forces but are highly sensitive to moment excitation. Owing to the configuration of the balancing machine of the invention, it is by means of the second vibration sensor that the vibrations of the upper part are detected in the second degree of freedom of motion performing pitch motions, and are separated from the imbalance-induced vibration components in the evaluating calculation. In this manner, reduced measuring accuracies caused by higher balancing speeds are avoided.

According to another proposal of the invention, a third vibration sensor may be arranged on the upper part of a pedestal to detect vibrations of the upper part in the direction of the axis of the spindle, with the evaluating circuit being configured to determine from the vibration signals of the third vibration sensor an axial force excitation and to remove in the evaluation of an unbalance measurement the component of the axial force excitation from the vibration signals for calculating the level of imbalance.

This embodiment of the balancing machine has the advantage that rotationally frequent axial forces which may cause an interference component in the vibration signals detected by the vibration sensors are unable to adversely affect the accuracy of unbalance measurement. Rotationally frequent axial forces may occur in the unbalance measurement of drive shafts when these have no axial compensation in the form of a sliding member or an axially displaceable homokinetic joint.

The method of the invention includes a calibrating step preceding an unbalance measurement of drive shafts, in which separate reference runs are performed on each of the two pedestals of the balancing machine, comprising performing a first reference run with zero or low transverse force and moment excitation, a second reference run with a transverse force excitation of known magnitude, and a third reference run with a moment excitation of known magnitude, harmonically analyzing the detected vibration signals of the reference runs, storing them as parameters and using them for calculation of a calibrating matrix, and evaluating the vibration signals in the subsequent unbalance measurement of a drive shaft by using the calculated calibrating matrix, such that pitch vibration excitations do not enter the unbalance value of the drive shaft calculated in the evaluation.

In a further embodiment of the method, provision may be made in the calibrating step for another reference run with an axial force excitation to detect vibrations of the upper part of the pedestal in the direction of the axis of the spindle by means of a vibration sensor, analyze them harmonically, store them as calibration factor, and, in the subsequent unbalance measurement of a drive shaft, separate them from the vibration signals for calculation of the unbalance value.

BRIEF DESCRIPTION OF THE DRAWINGS

The present invention will be explained in more detail in the following with reference to embodiments illustrated in the accompanying drawing, wherein.

DETAILED DESCRIPTION OF THE DRAWINGS

Figure 1:
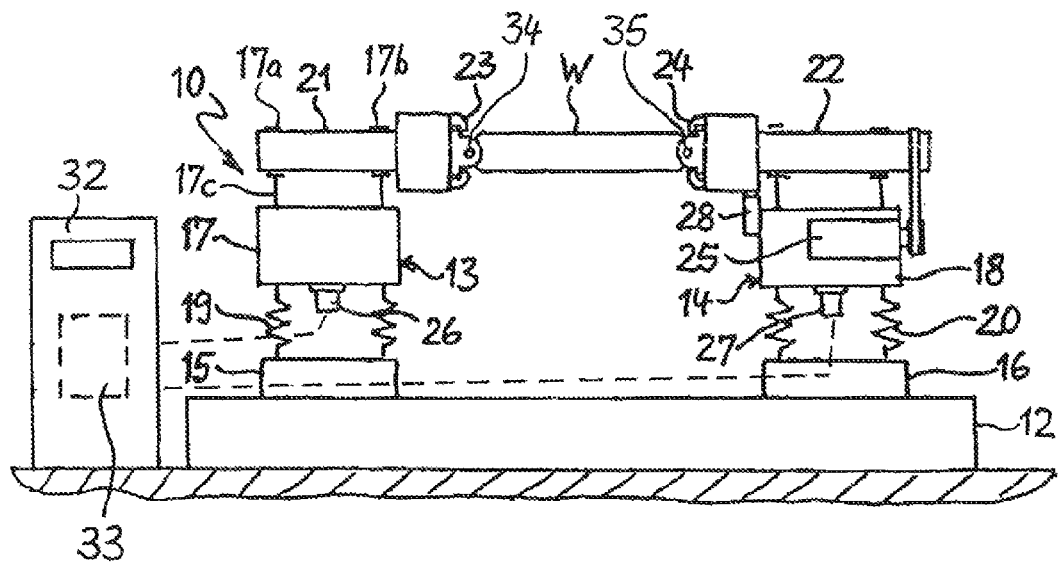
FIG. 1 is a schematic representation of a prior-art drive shaft balancing machine.

FIG. 1 shows the basic construction of a known balancing machine 10 intended for the balancing of drive shafts. The balancing machine 10 includes a machine bed 12 on which two pedestals 13, 14 are arranged opposite one another. The pedestals have a respective base 15, 16 which is mounted for longitudinal displacement in a linear guide extending in the longitudinal direction of the machine bed 12 and is movable to adapt the distance between the pedestals 13, 14 to the length of the drive shaft to be received. The bases 15, 16 carry an upper part 17, 18, respectively, supported on them by means of springs 19, 20. Each upper part 17, 18 accommodates a respective spindle 21, 22 mounted for rotation in bearing housings of bearings 17a, 17b. Each bearing 17a, 17b is connected to the upper part 17 by a rigid stand 17c. The spindles 21, 22 of the two upper parts 17, 18 are coaxially arranged and have at their facing ends clamping devices 23, 24 for accurately centrally locating a fastening end, for example, the end flange, of a drive shaft W. At least one upper part, in the drawing the upper part 18, includes a drive motor 25 adapted to set the spindle 22 and thereby the mounted drive shaft W in rotating motion. The other spindle 21 is freely rotatable together with the mounted end of the drive shaft W, but it may be equally provided with a drive motor. Each upper part 17, 18 includes furthermore a respective vibration sensor 26, 27 which detects vibrations of the respective upper part 17, 18 in one direction, in this embodiment the vertical direction, and transmits them in the form of electrical signals to an electronic evaluating and computing circuit 33 that is contained in a evaluating and computing device 32. To measure the rotary movement of the spindles 21, 22, an electric angle-of-rotation sensor 28 is also provided which is equally connected to the evaluating and computing circuit 33.

During a measuring run the drive shaft W is driven at a speed $\Omega$, with the unbalances of the drive shaft W exciting vibrations of the upper parts 17, 18 of the pedestals 13, 14. The vibrations and their speed are detected, and their phases and magnitudes enable the unbalance of the drive shaft 10 to be determined in two planes of measurement. Measurement planes of a drive shaft are the planes normal to the axis of rotation, i.e. the spindle axis A, and passing through the center of the joints 34, 35, because the forces induced by unbalance U are transmitted there as transverse forces Q to the drive shaft flanges mounted on the spindles. The unbalances of the drive shaft flanges and coupling parts are likewise detected in the measurement planes. The springs 19, 20 of the pedestals 13, 14 of drive shaft balancing machines are conventionally configured and arranged such that the upper parts 17, 18 of the pedestals 13, 14 oscillate as a result of excitation by these transverse forces in a way causing the axles of the spindles 21, 22 to execute parallel movements, thereby maintaining their direction normal to the measurement planes. The result thereby achieved is that the pedestals 13, 14 respond exclusively to the transverse forces caused by the drive shaft unbalance and transmitted by the joints 34, 35. Accordingly, each pedestal of a drive shaft balancing machine conventionally represents an unbalance measuring device for an unbalance plane.

This known and conventional configuration of drive shaft balancing machines has been proven in practice and produces satisfactory results at low speeds. Drive shafts however have a disposition toward a shaft-elastic behavior, resulting in the need to balance drive shafts at relatively high speeds in the vicinity of the future normal running speed. With the drive shaft running at higher speeds, the pedestal upper part, even when excited exclusively by transverse forces, no longer executes pure parallel vibrations, its vibrations containing instead components of pitching motions, cf. the position change of the pedestal upper part indicated in FIG. 2 in dashed lines. The pedestal no longer responds to transverse forces exclusively, but also to bending moments. The signal $u_1(t)$ of the vibration sensor then contains components caused by (rotationally frequent) transverse forces $\vec{Q}(t)$ and components caused by (rotationally frequent) bending moments $\vec{M}(t)$. Separating between these two causes is not possible when a single vibration sensor is used per pedestal. In consequence, determination of the unbalance is corrupted by moments acting on the pedestal upper part. The present invention shows a way how these measurement errors can be avoided by the use of a further sensor.

Figure 2:
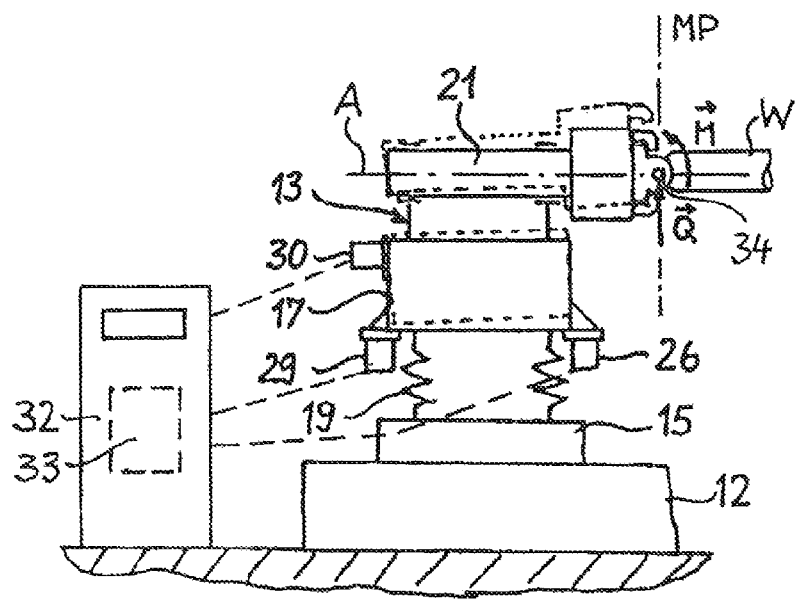
FIG. 2 is a schematic representation of a pedestal of drive shaft balancing machine of the invention.

According to the present invention, the upper parts of both pedestals of a drive shaft balancing machine are equipped with a first and a second vibration sensor. FIG. 2 shows the pedestal 13 of the drive shaft balancing machine 10 whose upper part 17 includes according to the invention two vibration sensors 26, 29. The two vibration sensors 26, 29 of the pedestal 13 are spaced from each other by a wide distance, as a result of which they deliver different signals $u_{1,1}(t)$ $u_{1,2}(t)$ when parallel and pitching vibrations are superimposed. For the harmonically analyzed measurement signals of vibration sensors, the balancing technology conventionally uses a $$\text{pointer representation } u(t) = \vec{u} \cdot e^{i\omega t} = \begin{pmatrix} u_{re} \\ u_{im} \end{pmatrix} \cdot e^{i\omega t}.$$

For excitation of a pedestal, the horizontal and the vertical components $$\vec{U} = \begin{pmatrix} U_h \\ U_v \end{pmatrix}, \vec{M} = \begin{pmatrix} M_h \\ M_v \end{pmatrix}, \vec{Q} = \begin{pmatrix} Q_h \\ Q_v \end{pmatrix}$$

are introduced in the coordinate system fixed to the rotor.

For the excitation forces and excitation moments, the following linear correlation then holds true $$\begin{pmatrix} Q_h \\ Q_v \\ M_h \\ M_v \end{pmatrix} = \begin{pmatrix} a & b & c & d \\ -b & a & -d & c \\ e & f & g & h \\ -f & e & -h & g \end{pmatrix} \cdot \begin{pmatrix} u_{1,re} \\ u_{1,im} \\ u_{2,re} \\ u_{2,im} \end{pmatrix},$$

where only eight free parameters occur in the 4×4 calibration matrix due to symmetries. These can be determined empirically by letting take effect in a reference run, for example, a small excitation $\vec{Q}^0 \approx 0$, $\vec{M}^0 \approx 0$ and subsequently a first and a second excitation of known magnitude, for example, $\vec{Q}^I = Q^{Kal}$, $\vec{M}^I \approx 0$, $\vec{Q}^{II} \approx 0$, $\vec{M}^{II} = M^{Kal}$, with the sensor signals being analyzed harmonically and saved as $\vec{u}_1^0$, $\vec{u}_1^I$, $\vec{u}_1^{II}$, $\vec{u}_2^0$, $\vec{u}_2^I$, $\vec{u}_1^{II}$.

Suitably, the excitation may be produced by placing test unbalance elements on the spindle. With this approach each pedestal is considered separately.

The eight free parameters a . . . h are obtained upon transposition of the equations by solving a linear equation system of the form $$\underline{A} \cdot \begin{pmatrix} a \\ b \\ c \\ d \\ e \\ f \\ g \\ h \end{pmatrix} = \begin{pmatrix} Q_h^I - Q_h^0 \\ Q_v^I - Q_v^0 \\ M_h^I - M_h^0 \\ M_v^I - M_v^0 \\ Q_h^{II} - Q_h^0 \\ Q_v^{II} - Q_v^0 \\ M_h^{II} - M_h^0 \\ M_v^{II} - M_v^0 \end{pmatrix}$$

The coefficients of the matrix $\underline{A}$ depend on the differences of the harmonically analyzed measurement signals $$(\vec{u}_1^I - \vec{u}_1^0), (\vec{u}_1^{II} - \vec{u}_1^0), (\vec{u}_2^I - \vec{u}_2^0), (\vec{u}_2^{II} - \vec{u}_2^0).$$

Once the calibration matrix is known, it is possible to separate the transverse force and the moment excitation on all subsequent measurements:

$$\begin{pmatrix} Q_h \\ Q_v \end{pmatrix} = \begin{pmatrix} a & b & c & d \\ -b & a & -d & c \end{pmatrix} \cdot \begin{pmatrix} u_{1,re} \\ u_{1,im} \\ u_{2,re} \\ u_{2,im} \end{pmatrix},$$

and, respectively, $$\begin{pmatrix} M_h \\ M_v \end{pmatrix} = \begin{pmatrix} e & f & g & h \\ -f & e & -h & g \end{pmatrix} \cdot \begin{pmatrix} u_{1,re} \\ u_{1,im} \\ u_{2,re} \\ u_{2,im} \end{pmatrix}.$$

The subsequent considerations then apply to the entire balancing machine with two pedestals.

The transverse force excitations of the first and second pedestal $$\begin{pmatrix} Q_{1,h} \\ Q_{1,v} \end{pmatrix}, \begin{pmatrix} Q_{2,h} \\ Q_{2,v} \end{pmatrix}$$

can then be fed to the conventional unbalance computation. The actual unbalance calibration then takes place by placing known unbalance elements in the measurement planes of the drive shaft. In this manner, it is possible to eliminate measurement errors caused by the effects of moments almost completely by means of a second sensor.

The moment excitations of the first and second pedestal $$\begin{pmatrix} M_{1,h} \\ M_{1,v} \end{pmatrix}, \begin{pmatrix} M_{2,h} \\ M_{2,v} \end{pmatrix}$$

would be normally ignored. Under circumstances, a test could be made to check whether a limit value is exceeded, because a manufacturer of drive shafts would possibly seek to limit, apart from the effect of imbalance, also the effect of moments on the flanged-on components.

Measurement problems may also occur if the drive shaft has no axial compensation (for example, a sliding member or a displaceable homokinetic joint). Rotationally frequent axial forces may then introduce an interference component in the measurement signal. According to the invention, by applying a third vibration sensor 30 to the upper part 17 of the pedestal 13, it is possible to detect the excitation by rotationally frequent axial forces and consider it in the calculation of the unbalance. This approach is perfectly analogous to the one described in the foregoing. First a reference run is performed without excitation, then three calibrating runs with transverse force excitation, moment excitation and axial force excitation. In this approach, the generation of rotationally frequent axial forces is somewhat more difficult because it cannot be accomplished by the placement of test unbalance elements. One possibility would include the use of a phase-true force exciter, but this would involve considerable expense. More practice-orientated would be, for example, a drive shaft with length compensation which is located in the clamping fixture with a defined axial offset. For the reference run and the first two calibrating runs the length compensation would be enabled, disabling it however for the last calibrating run. While a subsequent quantification of the measured axial forces is not possible, they can be separated nevertheless and eliminated from the unbalance measurement.

What is claimed is:
1. A drive shaft balancing machine for dynamic balancing of a drive shaft having flanges connected by joints to its ends, the drive shaft balancing machine comprising
a machine bed, at least two pedestals arranged on the machine bed, each pedestal respectively including
- an upper part configured as an unbalance measuring device for a single measurement plane and mounted on springs and receiving a spindle which is rotary about a spindle axis and includes a support for a flange at a respective end of a drive shaft to be balanced supported by the two pedestals, the springs being configured and arranged such that the upper part oscillates as a result of excitation by transverse forces caused by an unbalance of the drive shaft and transmitted by the joints in a way causing the spindle axis to execute parallel movements, thereby maintaining a direction normal to the single measurement plane, and
- a first vibration sensor which detects vibrations of the upper part resulting from the unbalance of the drive shaft as well as further involved forces in at least a first degree of freedom of motion normal to the spindle axis, a second vibration sensor mounted to the upper part of at least one pedestal of the at least two pedestals, the second vibration sensor detecting the vibrations of the upper part in at least a second degree of freedom of motion, and an evaluating circuit configured to receive and store the first and second vibration signals of the first and the second vibration sensors and configured to compute an unbalance value of the drive shaft by using the first and second vibration signals as parameters for calculation of a calibrating matrix, the calibrating matrix including free parameters, the computing including transposition of equations, wherein the first and second vibration sensors are spaced longitudinally across the at least one pedestal with no other vibration sensor being disposed longitudinally across the at least one pedestal, wherein pitch vibration excitations of the upper part do not enter the unbalance value of the drive shaft computed by the evaluating circuit.

2. A method for the dynamic balancing of drive shafts using a balancing machine according to claim 1, wherein a calibrating step precedes an unbalance measurement of drive shafts, the unbalance measurement measuring an unbalance value of the drive shaft, wherein separate reference runs are performed on each of the two pedestals of the balancing machine, comprising performing a first reference run with zero or low transverse force and moment excitation, a second reference run with a transverse force excitation of known magnitude, and a third reference run with a moment excitation of known magnitude, harmonically analyzing detected vibration signals of the reference runs, storing them as parameters and using them for calculation of a calibrating matrix including free parameters, and evaluating the detected vibration signals in the subsequent unbalance measurement of a drive shaft by using the calculated calibrating matrix including transposition of equations, and wherein pitch vibration excitations do not enter the unbalance value of the drive shaft calculated in the evaluating.

* * * * *